Figure 1:
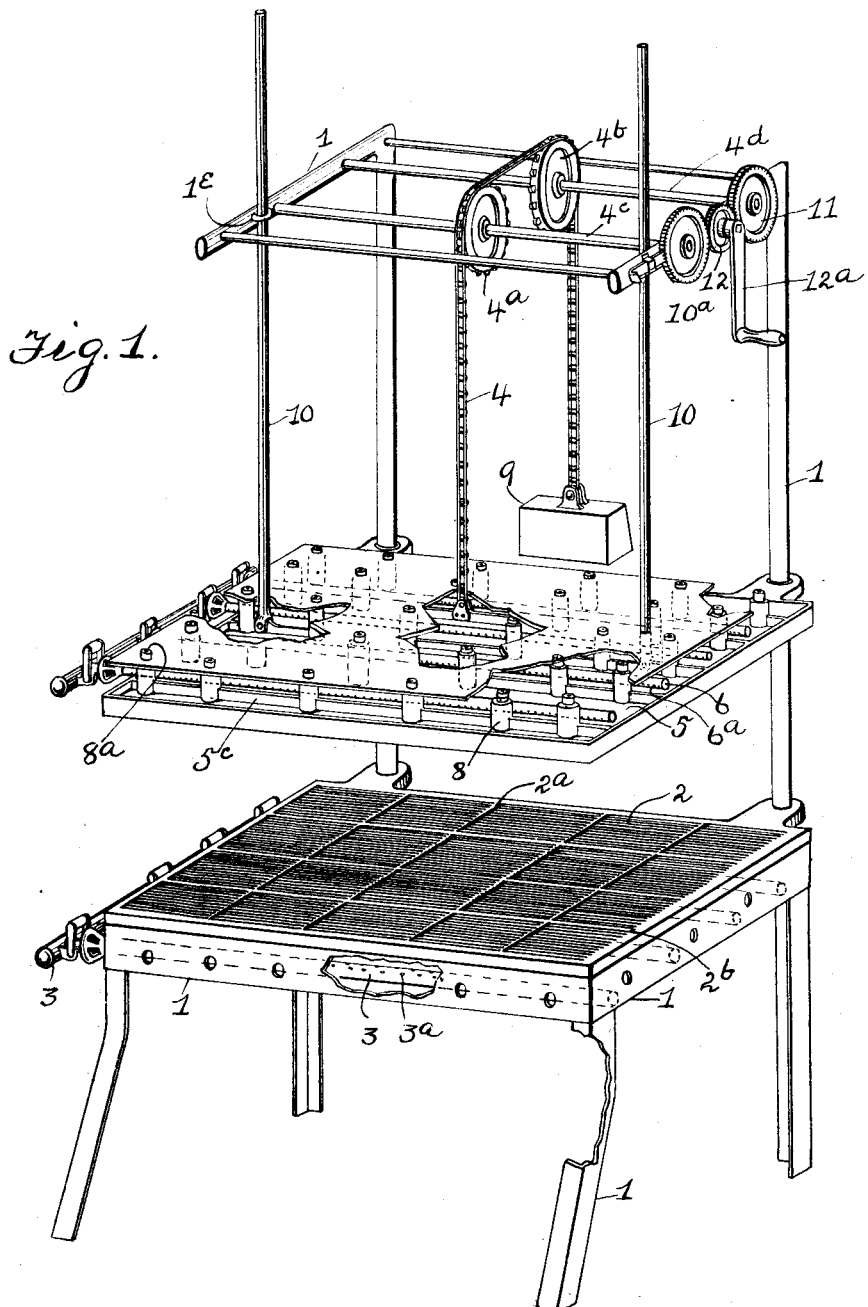

O. C. NUUBSON.
BAKING APPARATUS.
APPLICATION FILED JUNE 5, 1911.

1,031,085.

Patented July 2, 1912.
2 SHEETS—SHEET 1.

WITNESSES

INVENTOR
Ole C. Nuubson
By James T. Watson
his Attorney

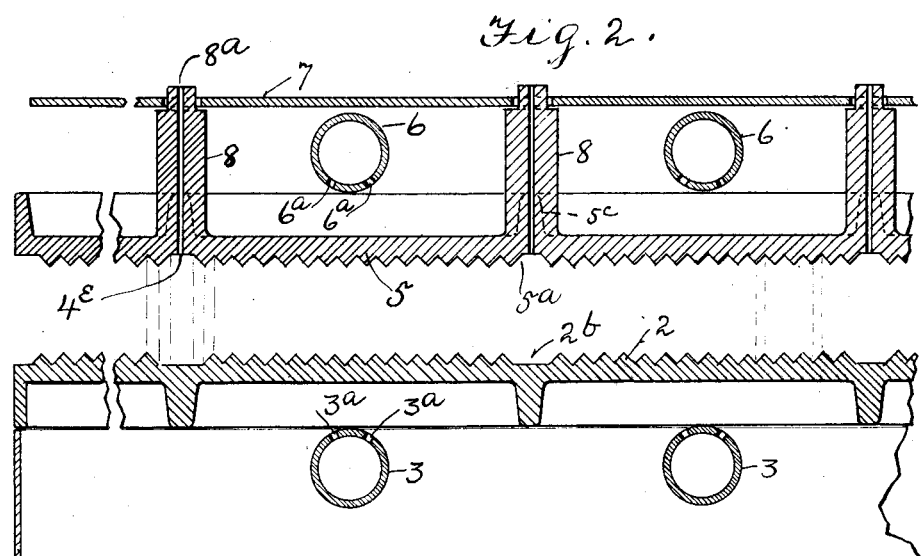

UNITED STATES PATENT OFFICE.

OLE C. NUUBSON, OF DULUTH, MINNESOTA.

BAKING APPARATUS.

1,031,085. Specification of Letters Patent. Patented July 2, 1912.

Application filed June 5, 1911. Serial No. 631,460.

*To all whom it may concern:*

Be it known that I, OLE C. NUUBSON, a subject of Norway, residing in Duluth, in the county of St. Louis and State of Minnesota, have invented certain new and useful Improvements in Baking Apparatus; and I do hereby declare the following is a full, clear, and exact description of the invention, such as will enable others skilled in the art to make and use the same.

My invention relates to bread baking apparatus and has for its object the provision of a simple and cheap apparatus for baking crisp wafer bread.

It consists in the constructions, combinations and arrangements of parts hereinafter described and claimed.

In the drawings, Figure 1, is a perspective view of my invention, partly broken away. Fig. 2 is a central vertical transverse view of an upper baking plate forming part of said invention, and Fig. 3 is a central vertical transverse view of a lower baking plate forming part of said invention.

In the drawings, 1 is a stationary frame, of any suitable construction, upon which is mounted a lower baking plate 2, provided with a corrugated upper surface, in which plate are preferably formed channels $2^a$ intersecting the corrugations therein and with channels $2^b$ running parallel with the corrugations, which channels are for the purpose of conveying away steam generated in the dough while baking, and for the further purpose of making the surface of the plate and the dough thereon into a plurality of squares. Supported on said frame and extending beneath said lower plate, are a plurality of heating elements of any suitable character or construction, as gas pipes 3, having upwardly directed ports $3^a$ adapted to direct the gas toward the bottom of said lower plate. Said lower plate is also preferably provided with suitable ribs $2^c$ upon its lower side to prevent warping and to strengthen the plate. Suspended by any suitable means above said lower plate, as by a sprocket chain 4, running over sprocket pulleys $4^a$ and $4^b$ mounted on shafts $4^c$ and $4^d$ supported on said frame, is an upper baking plate 5, provided with a corrugated lower surface, in which is preferably formed channels (not shown, but similar to channels $2^a$) intersecting said corrugations and with channels $5^a$ running parallel to said corrugations, which channels are for the purpose of conveying away steam generated in the dough while baking, and for the further purpose of marking the corrugated surface of said upper plate into squares. The upper surface of said upper plate is preferably provided with strengthening ribs $5^c$. Said channels in said upper plate preferably register with the channels in said lower plate. Mounted upon said upper plate and extending over the same are a plurality of heating elements of any suitable character or construction, as gas pipes 6 having downwardly directed ports $6^a$ adapted to direct the burning gas toward the upper surface of said upper plate. Mounted on said upper plate and spaced therefrom and extending over said heating elements thereon is a cover sheet 7 of any suitable construction, preferably constructed of heat insulating material as asbestos. Formed in said upper plate and preferably intersecting said channels therein are a plurality of steam exhaust ports $4^e$, and mounted upon said plate and extending through said cover sheet are a plurality of nipples 8 having ports $8^a$ formed therein registering with said ports $4^e$ through which steam generated in the dough while baking may escape. Upon the free end of said sprocket chain is preferably suspended a counter weight 9. Guide rods 10 are preferably mounted on said upper plate and extend through guides $1^e$ forming part of said frame upon the ends of said shafts $4^c$ and $4^d$ are mounted gears $10^a$ and 11 respectively for rotating said shafts, when it is desired to lower or raise said upper plate, and intermediate of said gears and engaged therewith is a pinion 12 for turning said gears, said pinion being preferably provided with a crank handle $12^a$ whereby it may be rotated.

In operation, the baking plates are first heated and the dough having been rolled out into a thin layer is then spread or laid upon the lower baking plate, the upper baking plate is then lowered on to the dough and by giving the pinion and gears an extra turn in the proper direction the counter weight may be lifted so as to permit the full weight of the upper baking plate and of the parts mounted thereon to rest upon the dough, thereby squeezing the dough into the depressions of the corrugated surfaces and pressing it into a very thin paper-like wafer, in which form it bakes quickly and crisply. The upper plate is then lifted and the wafer-bread product is removed in sections of regular size for packing and marketing.

While I have described one form of my invention, it is obvious that such form and construction may be modified in various details within the spirit and scope of the claim.

What I claim is:—

In a baking apparatus, the combination with a suitable support of a lower baking plate, an upper baking plate, a cover sheet extending over said upper plate and spaced therefrom, said upper plate having steam exhaust ports extending therethrough, nipples mounted upon said upper plate and extending through said cover sheet, said nipples having steam exhaust passages formed therein communicating with the steam exhaust passages in said upper plate and means for applying heat to one of said plates.

In testimony whereof, I hereunto affix my signature in presence of two witnesses.

OLE C. NUUBSON.

Witnesses:
 JAMES F. WATSON,
 H. G. GEARHART.